US006856643B1

(12) United States Patent
Yang et al.

(10) Patent No.: US 6,856,643 B1
(45) Date of Patent: Feb. 15, 2005

(54) COMMUNICATION SYSTEM AND METHOD FOR PERFORMING FAST SYMBOL ESTIMATION FOR MULTIPLE ACCESS DISPERSE CHANNELS

(75) Inventors: Weidong Yang, Richardson, TX (US); Guanghan Xu, Garland, TX (US)

(73) Assignee: Cwill Telecommunications, Inc., Austin, TX (US)

( * ) Notice: Subject to any disclaimer, the term of this patent is extended or adjusted under 35 U.S.C. 154(b) by 767 days.

(21) Appl. No.: 09/693,589

(22) Filed: Oct. 20, 2000

Related U.S. Application Data

(60) Provisional application No. 60/160,960, filed on Oct. 22, 1999.

(51) Int. Cl.[7] .......................... H04B 1/69; H04B 1/707; H04B 1/713
(52) U.S. Cl. ....................... 375/130; 375/134; 375/142; 375/150; 370/320
(58) Field of Search ......................................... 375/130

(56) References Cited

U.S. PATENT DOCUMENTS

| 6,301,293 | B1 | * | 10/2001 | Huang et al. ................ 375/130 |
| 6,397,066 | B1 | * | 5/2002 | Servi ........................... 455/446 |
| 2002/0021335 | A1 | * | 2/2002 | Sugama et al. ............... 347/65 |
| 2002/0141372 | A1 | * | 10/2002 | De et al. ...................... 370/342 |
| 2002/0141373 | A1 | * | 10/2002 | De et al. ...................... 370/342 |
| 2003/0026236 | A1 | * | 2/2003 | De et al. ...................... 370/342 |
| 2003/0026325 | A1 | * | 2/2003 | De et al. ...................... 375/147 |
| 2003/0218998 | A1 | * | 11/2003 | Kim et al. .................... 370/335 |

OTHER PUBLICATIONS

"Unified architecture for divide and conquer based tridiagonal System Solvers" Lopez, J.; Zapata, E.L.; Computers, IEEE Transactions on, vol.: 43, Issue: 12 , Dec. 1994 pp.:

Lupas et al., "Linear Multiuser Detectors for Synchronous Code–Division Multiple–Access Channels," Jan. 1989, pp. 123–136.

Alexander et al., "On the Windowed Cholesky Factorization of the Time–Varying Asynchronous CDMA Channel," Jun. 1998, pp. 735–737.

Sweet, "A Cyclic Reduction Algorithm for Solving Block Tridiagonal Systems of Arbitrary Dimension," Sep. 1977, pp. 706–720.

Zvonar et al., "Suboptimal Multiuser Detector for Frequency–Selective Rayleigh Fading Synchronous CDMA Channels," Feb. 1995, pp. 154–157.

Bravo, "Limited Linear Cancellation of Multiuser Interference in DS/CDMA Asynchronous Systems," Nov. 1997, pp. 14351443.

Xie et al., "A Family of Suboptimum Detectors for Coherent Multiuser Communications," May 1990, pp. 683–690.

* cited by examiner

*Primary Examiner*—Stephen Chin
*Assistant Examiner*—Harry Vartanian
(74) *Attorney, Agent, or Firm*—Meyertons Hood Kivlin Kowert & Goetzel, P.C.; Jeffrey C. Hood

(57) ABSTRACT

A method for estimating symbol sequences from multiple transmitters which communicate with common receivers sharing the same medium is disclosed. This invention can be used in wireless communications and wireline communications such as in cable modem sys terms and digital subscriber loops to speed up joint detection of symbol sequences of multiple transmitters to achieve low error probability. For convenience, only applications of this invention to wireless communications employing multiple antennas are described herein. The requirement for matrix operations like matrix inverses increase with the logarithm of the number of symbols instead of the number of symbols as with techniques based on Cholesky decomposition.

23 Claims, 5 Drawing Sheets

COMMUNICATION SYSTEM AND METHOD FOR PERFORMING FAST SYMBOL ESTIMATION FOR MULTIPLE ACCESS DISPERSE CHANNELS

REFERENCE TO RELATED APPLICATIONS

This applications claims benefit from the provisional application No. 60/160,960 filed Oct. 22, 1999.

BACKGROUND OF THE INVENTION

The present invention relates to wireless and wireline communication systems. More specifically, the present invention relates to an improved method for estimating symbol sequences of multiple sources sharing the same communication media. The invention is particularly useful for code-division-multiple-access (CDMA) receivers where the channel length is only limited to two neighboring symbols.

In a scenario where m receivers are utilized, the received signal at each receiver is the sum of the output of channels driven by u different user signals plus the noise at the receiver. The channel between receiver i and user j can be denoted as $h_{ij}$. In general, $h_{ij} \neq h_{qn}$ if $i \neq q$ or $j \neq n$. Noise signals at different receivers are assumed to be independent of one another. If the user signals are actually CDMA signals and the largest duration of $h_{ij}$, i=1, ..., m and j=1, ..., u is short enough compared to the symbol duration of those CDMA signals, the orthogonality of the spreading codes can guarantee the separation of CDMA signals at each receiver. Intersymbol interference (ISI) and multiple access interference (MAI) are negligible. When the largest duration of the signature waveforms is comparable with, or even larger than the symbol duration, ISI and MAI can become severe. The performance of detection made on symbols individually will not be good due to ISI and MAI. Such a situation calls for joint detection by which channel effects are modeled adequately and symbol sequences are estimated jointly. In minimum-mean-square-error (MMSE) based joint detection, which will be referred to as joint detection in the following, an inverse filtering process is used to remove intersymbol interference and multiple access interference. To do this, a coefficient matrix H formed from the channel responses is inverted. More precisely, the pseudo-inverse of this coefficient matrix: $(H^*H)^{-1}H^*$ must be found. The main problem associated with joint detection is that the computation thus involved is intensive. The dimension of H is determined by the number of users, the length of spreading sequences, the length of symbol sequences, and the number of receivers involved (even with only one receiver, the effect of multiple receivers can be achieved by sampling a received continuous signal at a multiple times of the symbol rate.). With a moderate number of users and a moderate number of symbols, the dimension of the coefficient matrix can be large. To speed up the inversion of the coefficient matrix, a Cholesky decomposition on $H^*H$ can be used. However, the computation amount involved in the Cholesky decomposition can still be substantial, as the requirement on matrix operations such as matrix inverses increases linearly with the number of symbols. It is therefore desirable to have a method to speed up the joint detection computation.

Prior to this invention, a class of multiuser detectors have been developed. The most prominent ones among many others include R. Lupas and Verdu, "Linear multiuser detectors for synchronous CDMA channels", IEEE Trans. on Information Theory, 1(35):123–136, January 1989.; Z. Xie et al. "A family of sub-optimum detectors for coherent multiuser comnmunication", IEEE Journal of Selected Areas in Communications, pages 683–690, May 1990; and Z. Zvonar and D. Brady, "Suboptimum multiuser detector for syncrhonous CDMA frequency-selective Rayleigh fading channels", IEEE Trans. on Communications, Vol. 43 No. 2/3/4, pp.154–157, February/March/April, 1995, Angel M. Bravo, "Limited linear cancellation of multiuser interference in DS/CDMA asynchronous system", pp. 1435–1443, November, 1997. They either design various finite-impulse-response filters to process the received signals, which are in essence approximate solutions of the MMSE based joint detection solution, or use Cholesky decomposition to solve the equations involving the large coefficient matrix, e.g. Paul D. Alexander and Lars Rasmussen, "On the windowed Cholesky factorization of the time-varying asynchronous CDMA channel", IEEE Trans. on communications, vol. 46, no. 6, pp.735–737, June, 1998, which gives the exact MMSE joint detection result with high computational complexity, i.e. complexity of matrix operations such as matrix inversion increases linearly with the number of symbols.

As in many communication systems, the length of ISI and MAI is often limited to several symbols, besides being Toeptliz or block Toeplitz matrix, the coefficient matrix is also banded. Fast algorithms developed for generic Toeplitz or block Toeplitz matrices, e.g. Georg Heinig and Karla Rost, "Algebraic Methods for Toeplitz-like Matrices and Operators", Birkhauser, 1984, do not take advantage of the fact that the coefficient matrix is banded. The aforementioned Cholesky factorization based algorithm, while taking advantage of the banded nature of the coefficient matrix, does not take advantage of the fact that the coefficient matrix is also Toeplitz or block Toeplitz, which leads to considerable increase of computational demand as the number of matrix operations such as matrix inversion increases with the number of symbols to be estimated Simpler versions of the method disclosed in this invention, have been used to solve numerically Poisson equations, e.g. Roland A. Sweet, "A cyclic reduction algorithm for solving block tridiagonal systems of arbitrary dimension", SIAM journal on Numerical Analysis, Vol. 14, pp. 706–720, September, 1977.

SUMMARY OF THE INVENTION

The present invention discloses a symbol detection system and method for multiple users in scenarios where the medium is shared by multiple users. The symbol detection system and method involve formulating the received signals as the product of the inverse of a block triadiagonal matrix and a vector formed by the symbol sequences. The block tridiagonal matrix is derived from the channel responses. The present invention includes a fast algorithm to find the product. The computational complexity of the disclosed method is linear with the number of symbols and the requirement for matrix operations such as matrix inversion increase with the logarithm of the number of symbols.

Figure 1:
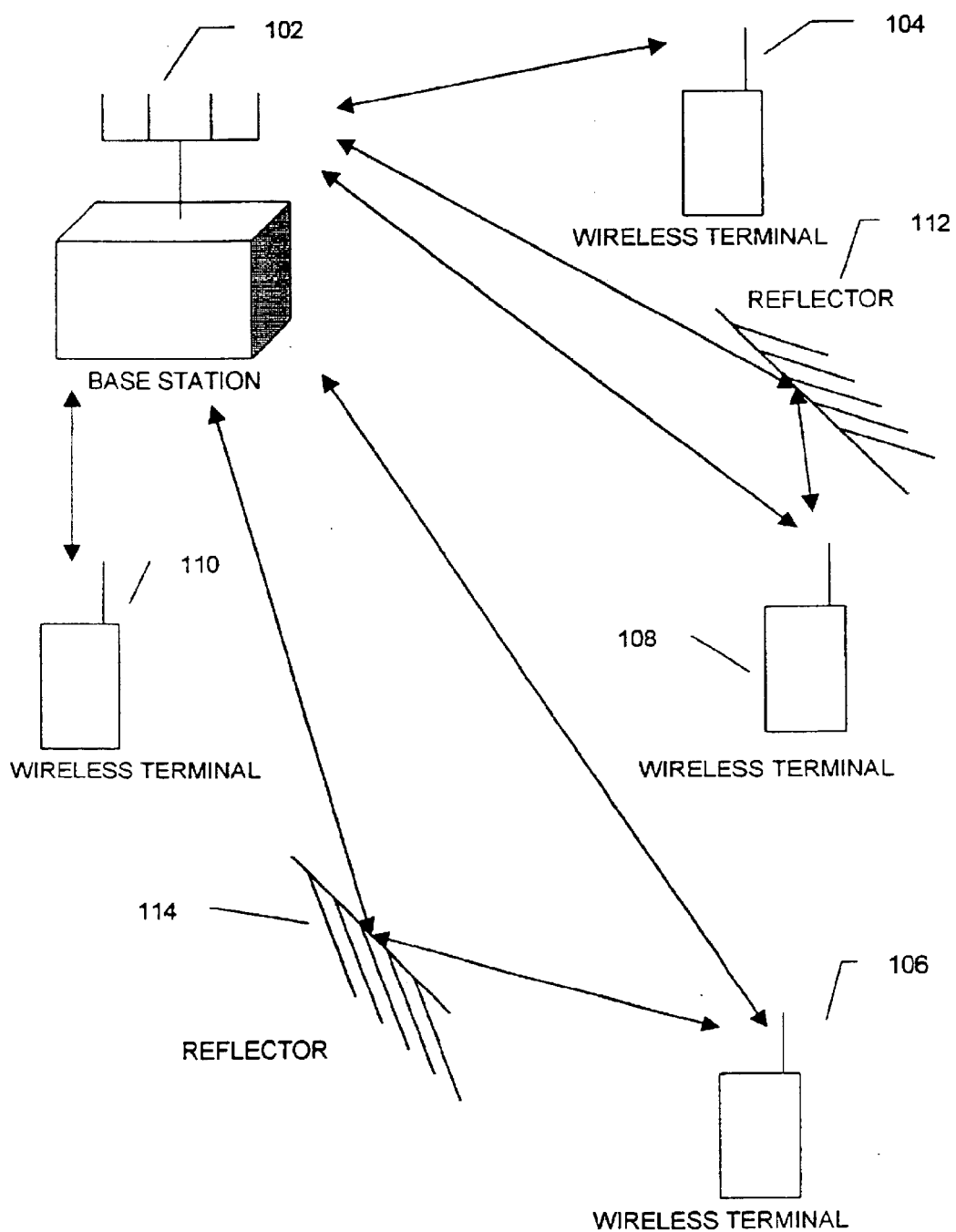
FIG. 1 is a graphic illustration of a wireless communications setup for the disclosed technique.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE DRAWINGS
Introduction

The basic problem under consideration is that of estimation of symbol sequences with intersymbol interference and multiple access interference. To give a concrete setup of the joint detection problem under study, we consider a wireless CDMA system with multiple antennas (receivers) at the base station, and consider the joint detection problem of finding the symbol sequences from these users, i.e., the joint detection problem of the uplink signals received at the base station. As was made clear previously, by oversampling, the effect of multiple virtual receivers can be achieved with only one physical receiver, the applicability of the procedures which will be given is apparent for the joint detection problem of downlink signals also. In a code division multiple access system with J users, there are M (M≧1) antennas and hence ar physical receivers at the base station, and the length of the spreading sequences is P. In one embodiment, the received signal at each physical receiver is oversampled at $M_t$ times the chip rate thereby producing a plurality of received signals each sampled at the chip rate. In other words, for each physical receiver, the received signal is oversampled to produce a number of chip rate signals. Hence at the base station, the signal received at antenna i can be represented as follows:

$$r_i(n) = \sum_k h_{ik}(n) * c_k(n), i = 1, \ldots M,$$

where $h_{ik}(n)$ is the signature waveform of the channel between the k-th user and the i-th antenna at the base station. The signature waveform can be identified either by blind methods or with training sequences, e.g. Tong et al., "Blind Identification and Equalization Based on Second-Order Statistics: A Time-Domain Approach", IEEE Trans. on Information Theory, March, 1994.

As mentioned above, the received signal at each physical receiver may be oversampled at $M_t$ times the chip rate. More generally, the received signal at each physical receiver may be sampled with a time interval equal to a 1/F fraction of the symbol time duration (i.e. the fixed time duration of the symbols being used in the system), where F Is an integer no smaller than $$\frac{J}{MM_t},$$

where $M_t$ is a positive integer.

FIG. 1 shows one example of an embodiment where the invention may be used. A base station (102) receives signals from wireless terminals (104, 106, 108, 110). For some wireless terminals(106, 108), there is more than one path between them and and the base station, as made clear by the reflective paths by reflectors (112, 114). Path length difference among multiple paths can destroy the orthogonality of signal waveforms of different transmitters which may have existed. Methods based matched filters and simple despreading are not able to offer satisfactory results under such circumstances. MMSE joint detection can offer much better results with heavier computation complexity. The disclosed method is able to reduce the computation amount requirement for implementing MMSE joint detection considerably.

In the embodiment of FIG. 1, the symbol estimator of the invention may be comprised in the base station (102) for estimating symbols in uplink transmissions from wireless terminals (104,106,108,110). The symbol estimator of the invention may also be comprised in one or more of the wireless terminals (104,106,108,110) for estimating symbols in downlink transmission from base station (102).

Figure 2:
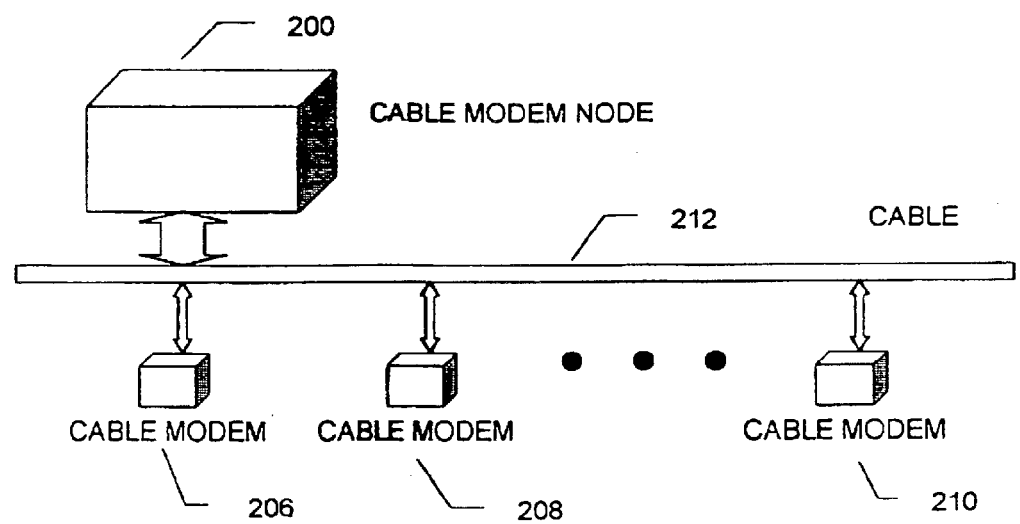
FIG. 2 is a graphic illustration of a wireline communications setup for the disclosed technique.

FIG. 2 shows another embodiment of the disclosed invention. A cable modem node (200) receives signals from multiple cable modems (206, 208, 210) which share the same cable medium (212) to communicate with the cable modem node (200). The channels from different cable modems to the cable modem node (200) will be different. In the embodiment of FIG. 2, the symbol estimator of the invention may be comprised in the cable modem node (200). Similar to the situation shown in FIG. 1, the disclosed technique can also be applied to speed up the joint detection method that combats the dispersive channel effects. It is not difficult to see that the invented technique can be applied in a reversed way, i.e., the cable modems (206,208, 210) may include the symbol estimator of the invention and may receive the signal from the cable modem node (200).

In one embodiment, the channel responses are convolutions of physical channels and their corresponding pulse shaping filters. In another embodiment, the channel responses are convolutions of physical channels and their corresponding spreading codes of the signals in the code-division-multiple-access communication system, In vet another embodiment, the channel responses are convolutions of physical channels, their corresponding spreading codes of the signals, and their corresponding pulse shaping filters in the code-division-multiple-access communication system.

Figure 3:
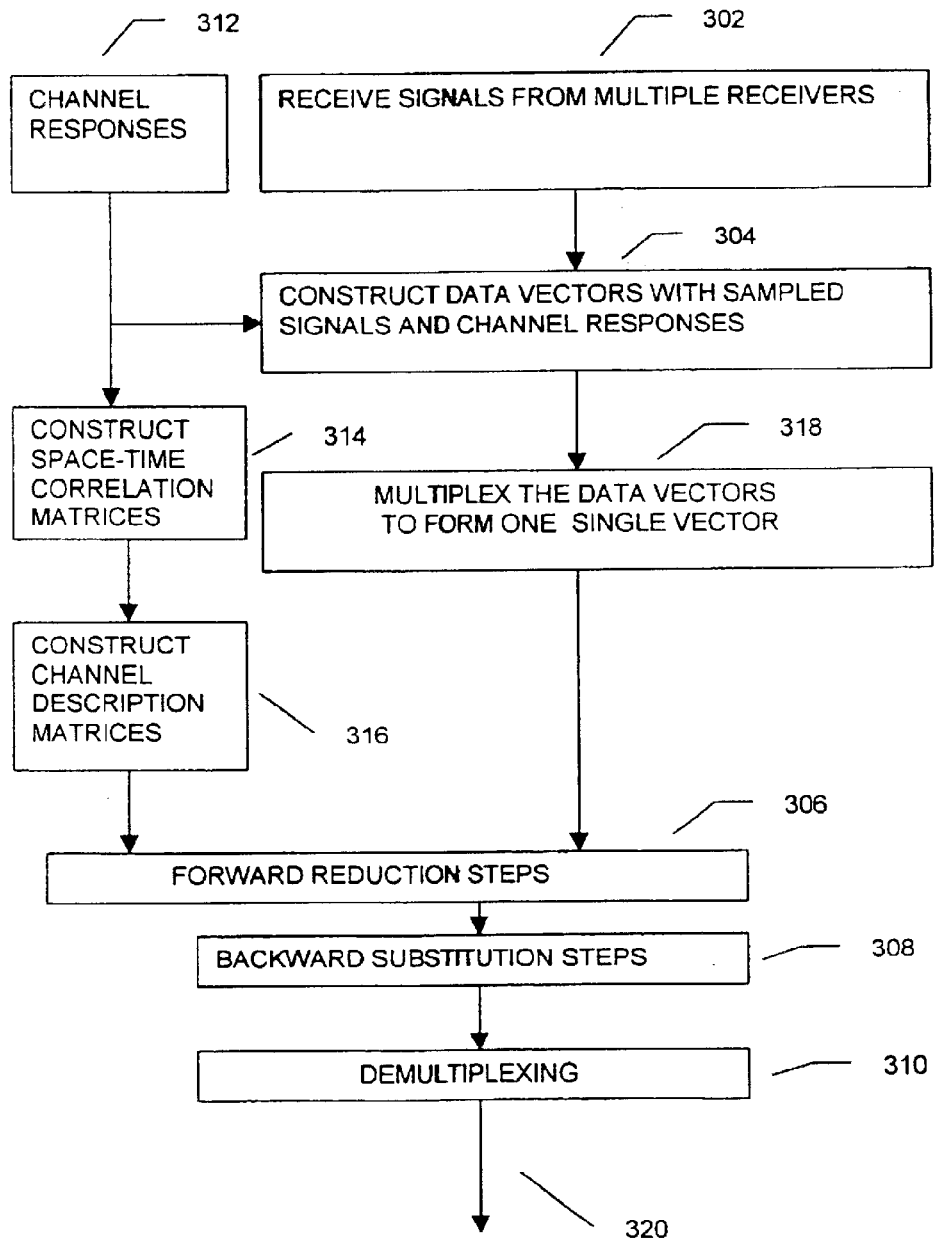
FIG. 3 is an overview of the disclosed algorithm.

FIG. 3 shows one embodiment of the method used by this invention to estimate symbol sequences of multiple users. The base-band signals are collected and sampled from multiple receivers (302). In (304), At each receiver, the channel response between a transmitter and that receiver is used to filter the sampled received signal at that receiver. As there are J channel responses between all the transmitters and that receiver, there are a total of J filtered outputs produced from the sampled received signal at receiver. All the outputs are multiplexed to form a single data vector, according the transmitter indices, in an ascending order. Next all the multiplexed data vectors from all the receivers are added up to form one single vector $Y_1$ (318).

Channel responses $h_{mj}(n)$, m=1, ..., M, j=1, ..., J (312) between transmitters and receivers are identified either by training sequences or other methods which are not specified in this invention. Space-time correlation matrices $T_i$, i=d, d-1, ..., -(d-1), -d, are constructed from those channel responses (312). Channel description matrices $A_1$, $B_1$, and $D_i$ are block Toeplitz matrices, the blocks of which are defined by $T_i$, i=d, d-1, ..., -(d-1), -d, which are constructed to form the description matrices (316). Forward reduction steps (306) are initialized with the second set of matrices and vectors, i.e. $A_1$, $B_1$, $D_1$ and $Y_1$. In the course of forward reduction, using the bisection approach, some intermediate matrices which will be used in the backward substitution steps in (308) are stored. At the beginning of backward substitution steps (308), the intermediate solution $X_s$ is found. Solved unknowns and intermediate matrices which have been stored in the forward reduction steps are used to find other unknowns. The output of the backward substitution steps (308) is demultiplexed (310) to produce the estimate of symbol sequences sent by transmitters.

Figure 4:
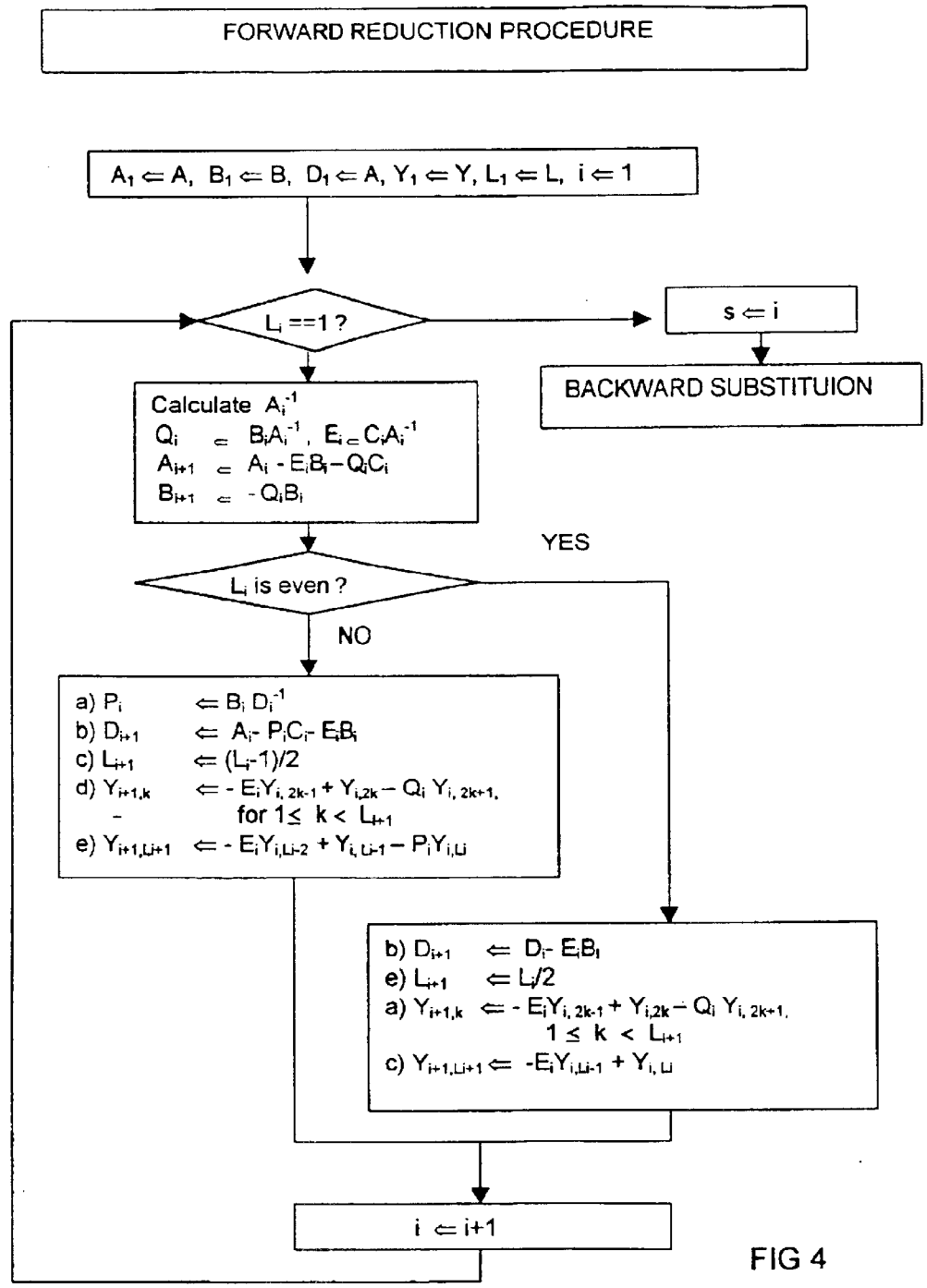
FIG. 4 is a flow chart of the forward reduction procedure.

FIG. 4 is a flow chart showing the forward reduction procedure.

Figure 5:
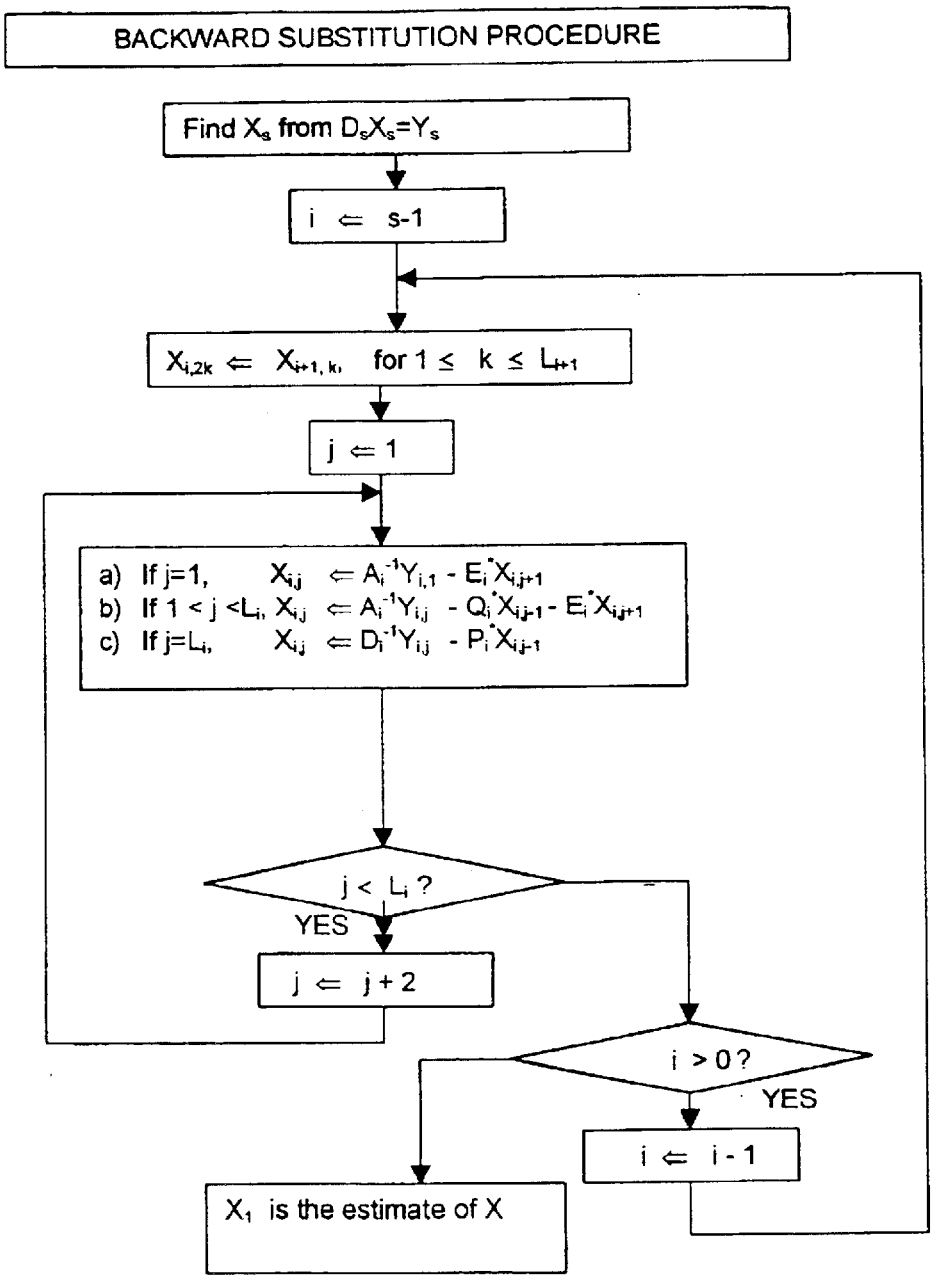
FIG. 5 is a flow chart of the backward substitution procedure.

FIG. 5 is a flow chart showing the backward substitution procedure.

Data Formation

In this disclosure, cases where signature waveforms of arbitrary duration are considered. In the following, we will write the received signals as the convolution of signature waveforms and oversampled symbol sequences in a structural way, which facilitates the derivation of the fast algorithm. If the signature waveform duration is limited to d+1 symbol duration, then we can pad zeros to $h_{i,k}(n)$ so that the length of $h_{i,k}(n)$ is precisely (d+1)P. Assume that $h_{mj}(n)$, $1 \leq m \leq M$, $1 \leq j \leq J$ are column vectors, which are identified with either training sequences or other means, which is not specified in this invention (312). We first define some notation. We divide $h_{mj}(n)$ into (d+1) parts:

$$h_{mj} = \begin{bmatrix} h_1^{(mj)} \\ h_2^{(mj)} \\ \vdots \\ h_{d+1}^{(mj)} \end{bmatrix},$$

where $h_j^{(mj)}$, j=1, ..., d+1, are P×1 vectors. We put together the signature waveform vectors:

$$\begin{bmatrix} \overbrace{h_{m1} \; \cdots \; h_{mJ}}^{J} \end{bmatrix} = \begin{bmatrix} h_1^{(m1)} & \cdots & h_1^{(mJ)} \\ h_2^{(m1)} & \cdots & h_2^{(mJ)} \\ \vdots & \vdots & \vdots \\ h_{d+1}^{(m1)} & \cdots & h_{d+1}^{(mJ)} \end{bmatrix} = \begin{bmatrix} H_1^{(m)} \\ H_2^{(m)} \\ \vdots \\ H_{d+1}^{(m)} \end{bmatrix},$$

where $$H_k^{(m)} := \begin{bmatrix} \overbrace{h_j^{(m1)} \; \cdots \; h_j^{(mJ)}}^{J} \end{bmatrix},$$

$H_k^{(m)}$ is a P×J matrix, k=1, ..., d+1.

Put the received signal at receiver m into a vector fashion:

$$\underbrace{L+d \begin{Bmatrix} r_m(1) \\ r_m(2) \\ \vdots \\ r_m((L+d)P) \end{Bmatrix}}_{R_m} = \underbrace{L+d \begin{Bmatrix} \overbrace{\begin{pmatrix} H_1^{(m)} & & & \\ \ddots & \ddots & & \\ H_{d+1}^{(m)} & \ddots & \ddots & \\ & \ddots & \ddots & H_1^{(m)} \\ & & & H_{d+1}^{(m)} \end{pmatrix}}^{L} \end{Bmatrix}}_{H_m} \underbrace{\begin{bmatrix} x_1(1) \\ x_2(1) \\ \vdots \\ x_J(1) \\ \vdots \\ x_1(L) \\ x_2(L) \\ \vdots \\ x_J(L) \end{bmatrix}}_{x}.$$

By stacking the received signals: $R_m$, m=1, ..., M, one over another, we have $$\underbrace{\begin{bmatrix} R_1 \\ R_2 \\ \vdots \\ R_M \end{bmatrix}}_{R} = \underbrace{\begin{bmatrix} H_1 \\ H_2 \\ \vdots \\ H_M \end{bmatrix}}_{H} X + \underbrace{\begin{bmatrix} W_1 \\ W_2 \\ \vdots \\ W_M \end{bmatrix}}_{W} \quad (1)$$

The objective of joint detection is to find X. If $$(L+1)PM \geq LJ, \quad (2)$$

then normally H is a full rank matrix.

The zero forcing solution is given by $$\hat{X} = (H*H)^{-1}H*R = \left(\sum_{m=1}^{M} H_m^* H_m\right)^{-1} \sum_{m=1}^{M} H_m^* R_m. \quad (3)$$

The MMSE (minimum mean square error) solution is given by $$\hat{X} = (H*H+\sigma^2 I)^{-1}H*R = \left(\sum_{m=1}^{M} H_m^* H_m + \sigma^2 I\right)^{-1} \sum_{m=1}^{M} H_m^* R_m, \quad (4)$$

where $\sigma^2$ is the variance of the noise. We define a matrix:

$$T := H*H + \upsilon I = \sum_{m=1}^{M} H_m^* H_m + \upsilon I,$$

and a vector $$Y := \sum_{m=1}^{M} H_m^* R_m,$$

where v can be either 0 or $\sigma^2$ depending on whether the zero-forcing solution or the MMSE solution is in need. $H_m^* R_m$, m=1, ..., M are formed in (304). Y is formed in (318). In both zero-forcing and MMSE solutions, the computation of $\hat{X}$ can be separated in two steps:

1. Find Y.
2. Find $T^{-1}Y$.

In either case, T is a block banded matrix, defined in the following way, $$T = \begin{bmatrix} T_0 & \ddots & T_{-d} & & & & \\ \ddots & \ddots & \ddots & \ddots & & & \\ T_d & \ddots & \ddots & \ddots & \ddots & & \\ & \ddots & \ddots & \ddots & \ddots & \ddots & \\ & & \ddots & \ddots & \ddots & \ddots & T_{-d} \\ & & & \ddots & \ddots & \ddots & \ddots \\ & & & & T_d & \ddots & \ddots & T_0 \end{bmatrix}_{LJ \times LJ}, \quad (5)$$

where $$T_i = \sum_{m=1}^{M} \sum_{k=0}^{d+i} (H_{d+1-k}^{(m)})^* H_{d+1-k+i}^{(m)} + \delta(i)\upsilon I,$$

$$T_{-i} = T_i^*, i = 0, -1 \ldots, -d.$$

And $T_i$, i=d, d−1, ..., −(d−1), −d are called space-time correlation matrices (314), delta(•) is the Kronecker fiction.

We can represent T as a block tridiagonal matrix, if d divides L:

1. the diagonal block A is given by $$A = \begin{bmatrix} T_0 & \ddots & \ddots & T_{-(d-1)} \\ \ddots & \ddots & \ddots & \ddots \\ \ddots & \ddots & \ddots & \ddots \\ T_{d-1} & \ddots & \ddots & T_0 \end{bmatrix}_{dJ \times dJ},$$

2. the supra-diagonal block B is given by $$B = \begin{bmatrix} T_{-d} & & & \\ \ddots & \ddots & & \\ & \ddots & \ddots & \\ T_{-1} & \ddots & \ddots & T_{-d} \end{bmatrix}_{dJ \times dJ}$$

We can write $$L \left\{ \begin{bmatrix} \overbrace{\begin{matrix} A & B & & & & \\ B^* & A & B & & & \\ & \ddots & \ddots & \ddots & & \\ & & \ddots & \ddots & \ddots & \\ & & & B^* & A & B \\ & & & & B^* & A \end{matrix}}^{L} \end{bmatrix} \right\} \hat{X} = Y. \quad (7)$$

Fast Joint Detector

Derivation

The system of equations as given in (7) can be treated as the special case of a more general formulation defined by a triplet [A, B, D]:

$$L_i \left\{ \begin{bmatrix} \overbrace{\begin{matrix} A_i & B_i & & & & \\ B_i^* & A_i & B_i & & & \\ & \ddots & \ddots & \ddots & & \\ & & \ddots & \ddots & \ddots & \\ & & & B_i^* & A_i & B_i \\ & & & & B_i^* & A_i \end{matrix}}^{L_i} \end{bmatrix} \right\} X_i = Y_i, \quad (8)$$

where $A_i$, $B_i$, and $D_i$ are J×J matrices, which are called channel description matrices (316), $$X_i = \begin{bmatrix} X_{i,1} \\ \vdots \\ X_{i,L_i} \end{bmatrix}, \quad (9)$$

$$Y_i = \begin{bmatrix} Y_{i,1} \\ \vdots \\ Y_{i,L_i} \end{bmatrix} \quad (10)$$

with $X_{i,j}$ and $Y_{i,j}$ being J×1 vectors.

We linearly combine equations for the following cases:

1. for 2k=2 (i.e. k=1), $$\begin{matrix} 2k-1: & -B_i^* A_i^{-1} \times \\ 2k: & I \times \\ 2k+1: & -B_i A_i^{-1} \times \end{matrix} \left( \begin{bmatrix} A_i & B_i & & \\ B_i^* & A_i & B_i & \\ & B_i^* & A_i & B_i \end{bmatrix} \begin{bmatrix} X_{i,2k-1} \\ X_{i,2k} \\ X_{i,2k+1} \\ X_{i,2k+2} \end{bmatrix} = \begin{bmatrix} Y_{i,2k-1} \\ Y_{i,2k} \\ Y_{i,2k+1} \end{bmatrix} \right), \quad (11)$$

and we have $$[0 \quad -B_i^* A_i^{-1} B_i + A_i - B_i A^{-1} B_i^* \quad 0 \quad -B_i A_i^{-1} B_i] \begin{bmatrix} X_{i,2k-1} \\ X_{i,2k} \\ X_{i,2k+1} \\ X_{i,2k+2} \end{bmatrix} = \quad (12)$$

$$-B_i^* A_i^{-1} Y_{i,2k-1} + Y_{i,2k} - B_i A_i^{-1} Y_{i,2k+1}, \text{ or}$$

$$[-B_i^* A_i^{-1} B_i + A_i - B_i A^{-1} B_i^* \quad -B_i A_i^{-1} B_i] \begin{bmatrix} X_{i,2k} \\ X_{i,2k+2} \end{bmatrix} = \quad (13)$$

$$-B_i^* A_i^{-1} Y_{i,2k-1} + Y_{i,2k} - B_i A_i^{-1} Y_{i,2k+1}.$$

2. For every even index 2k(4≤2k<$L_i$−3), we can linearly combine the 2k−1$^{st}$, 2k$^{th}$, and 2k+1$^{st}$ equations in system of equations (8):

$$\begin{matrix} 2k-1: & -B_i^* A_i^{-1} \times \\ 2k: & I \times \\ 2k+1: & -B_i A_i^{-1} \times \end{matrix} \left( \begin{bmatrix} B_i^* & A_i & B_i & & \\ & B_i^* & A_i & B_i & \\ & & B_i^* & A_i & B_i \end{bmatrix} \begin{bmatrix} X_{i,2k-2} \\ X_{i,2k-1} \\ X_{i,2k} \\ X_{i,2k+1} \\ X_{i,2k+2} \end{bmatrix} = \begin{bmatrix} Y_{i,2k-1} \\ Y_{i,2k} \\ Y_{i,2k+1} \end{bmatrix} \right), \quad (14)$$

and we have $$[-B_i^* A_i^{-1} B_i^* \quad 0 \quad -B_i^* A_i^{-1} B_i + A_i - B_i A^{-1} B_i^* \quad 0 \quad -B_i A_i^{-1} B_i] \begin{bmatrix} X_{i,2k-2} \\ X_{i,2k-1} \\ X_{i,2k} \\ X_{i,2k+1} \\ X_{i,2k+2} \end{bmatrix} = \quad (15)$$

$$-B_i^* A_i^{-1} Y_{i,2k-1} + Y_{i,2k} - B_i A_i^{-1} Y_{i,2k+1}, \text{ or}$$

$$[-B_i^* A_i^{-1} B_i^* \quad -B_i^* A_i^{-1} B_i + A_i - B_i A^{-1} B_i^* \quad -B_i A_i^{-1} B_i] \begin{bmatrix} X_{i,2k-2} \\ X_{i,2k} \\ X_{i,2k+2} \end{bmatrix} = \quad (16)$$

$$-B_i^* A_i^{-1} Y_{i,2k-1} + Y_{i,2k} - B_i A_i^{-1} Y_{i,2k+1}.$$

3. Depending on whether $L_i$ is odd or even, we need to study two different cases.
   (a) If $L_i$ is odd, the last even index 2k between 1 and $L_i$ is $L_i$−1. Let $L_i$=2j+1, so k=j. We combine the last three equations $$2j-1: \quad -B_i^* A_i^{-1} \times \left( \begin{bmatrix} B_i^* & A_i & B_i & \\ & B_i^* & A_i & B_i \\ & & B_i^* & D_i \end{bmatrix} \begin{bmatrix} X_{i,2j-2} \\ X_{i,2j-1} \\ X_{i,2j} \\ X_{i,2j+1} \end{bmatrix} = \begin{bmatrix} Y_{i,2j-1} \\ Y_{i,2j} \\ Y_{i,2j+1} \end{bmatrix} \right), \quad (17)$$

$$2j: \quad I \times$$

$$2j+1: \quad -B_i D_i^{-1} \times$$

we have $$[-B_i^* A_i^{-1} B_i^* \quad 0 \quad -B_i^* A_i^{-1} B_i + A_i - B_i D_i^{-1} B_i^* \quad 0\;] \begin{bmatrix} X_{i,2j-2} \\ X_{i,2j-1} \\ X_{i,2j} \\ X_{i,2j+1} \end{bmatrix} = \quad (18)$$

$$-B_i^* A_i^{-1} Y_{i,2j-1} + Y_{i,2j} - B_i D_i^{-1} Y_{i,2j+1}, \text{ or}$$

$$[-B_i^* A_i^{-1} B_i^* \quad -B_i^* A_i^{-1} B_i + A_i - B_i D_i^{-1} B_i^*] \begin{bmatrix} X_{i,2j-2} \\ X_{i,2j} \end{bmatrix} = \quad (19)$$

$$-B_i^* A_i^{-1} Y_{i,2j-1} + Y_{i,2j} - B_i D_i^{-1} Y_{i,2j+1}.$$

(b) If $L_i$ is even, the last even index 2k between 1 and $L_i$ is $L_i$. Let $L_i=2j$. We combine the last two equations:

$$2j-1: \quad -B_i^* A_i^{-1} \times \left( \begin{bmatrix} B_i^* & A_i & B_i \\ & B_i^* & D_i \end{bmatrix} \begin{bmatrix} X_{i,2j-2} \\ X_{i,2j-1} \\ X_{i,2j} \end{bmatrix} = \begin{bmatrix} Y_{i,2j-1} \\ Y_{i,2j} \end{bmatrix} \right), \text{ we have} \quad (20)$$

$$2j: \quad I \times$$

$$[-B_i^* A_i^{-1} B_i^* \quad 0 \quad -B_i^* A_i^{-1} B_i + D_i] \begin{bmatrix} X_{i,2j-2} \\ X_{i,2j-1} \\ X_{i,2j} \end{bmatrix} = \quad (21)$$

$$-B_i^* A_i^{-1} Y_{i,2j-1} + Y_{i,2j}, \text{ or}$$

$$[-B_i^* A_i^{-1} B_i^* \quad -B_i^* A_i^{-1} B_i + D_i] \begin{bmatrix} X_{i,2j-2} \\ X_{i,2j} \end{bmatrix} = -B_i^* A_i^{-1} Y_{i,2j-1} + Y_{i,2j}. \quad (22)$$

To facilitate a structural description of the newly-generated equations, we can define the following:

$$A_{i+1} := -B^* A_i^{-1} B_i + A_i - B_i A_i^{-1} B^*_i,$$

$$B_{i+1} := -B_i A_i^{-1} B_i. \quad (23)$$

If $L_i$ is odd, we define $$D_{i+1} := A_i - B_i D_i^{-1} B^*_i A_i^{-1} B_i, \quad (24)$$

and $$L_{i+1} := \tfrac{1}{2}(L_i - 1). \quad (25)$$

If $L_i$ is even, we define $$D_{i+1} := D_i - B^*_i A_i^{-1} B_i, \quad (26)$$

and $$L_{i+1} := \tfrac{1}{2} L_i. \quad (27)$$

We also define $$X_{i+1,k} := X_{i,2k}, 1 \le 2k \le L_i. \quad (28)$$

$A_{i+1}$, $B_{i+1}$, and $D_{i+1}$, are the new channel description matrices.

Substitute the above newly-defined variables into equations (16) and (13) for $1 \le 2k \le L_i - 2$, and equation (19) if $L_i$ is odd, or equation (22) if $L_i$ is even. We obtain the following system of equations:

$$\begin{bmatrix} L_{i+1} \left\{ \begin{matrix} A_{i+1} & B_{i+1} & & & & \\ B^*_{i+1} & A_{i+1} & B_{i+1} & & & \\ & \ddots & \ddots & \ddots & & \\ & & \ddots & \ddots & \ddots & \\ & & & B^*_{i+1} & A_{i+1} & B_{i+1} \\ & & & & B^*_{i+1} & D_{i+1} \end{matrix} \right. \end{bmatrix} X_{i+1} = Y_{i+1}. \quad (29)$$

We call the system of equations given in (29) as the $i+1^{st}$ system of equations. Hence a system of equations of reduced dimension involving only $X_{ij}$ of even indices as unknowns is obtained in the cancellation process, and $Y_{i+1}$ is obtained. It can be seen that the coefficient matrix, defined by the triplet $[A_{i+1}, B_{i+1}, D_{i+1}]$ is still a block-tridiagonal matrix, even though of smaller dimension than the coefficient matrix defined by by the triplet $[A_i, B_{i,}, D_i]$. Hence the same procedure can be again applied to this new system of equations. With the execution of the procedure each time, the size of the system of equations is reduced by at least a half. If we start from the $1^{st}$ system of equations as given in (10), by executing this procedure not more than $\log_2(L_1)$ times, we can generate the $2^{nd}, 3^{rd}, \ldots$ systems of equations. Eventually, at some s, the $s-1^{th}$ system of equations would be given either as $$\begin{bmatrix} A_{s-1} & B_{s-1} & \\ B^*_{s-1} & A_{s-1} & B_{s-1} \\ & B^*_{s-1} & D_{s-1} \end{bmatrix} X_{s-1} = Y_{s-1}, \text{ or} \quad (30)$$

$$\begin{bmatrix} A_{s-1} & B_{s-1} \\ B^*_{s-1} & D_{s-1} \end{bmatrix} X_{s-1} = Y_{s-1}. \quad (31)$$

(30) and (31) can be reduced to the $s^{th}$ system of equations involving one u×1 subvector: $X_{s,1}$ as unknown, respectively through (17) and (20):

$$D_s X_s = Y_s, \quad (32)$$

we have $$X_s = D_s^{-1} Y_s. \quad (33)$$

The just-found $X_{s,1}$ (or $X_{s-1,2}$ as in the $s-1^{st}$ system of equations) can be substituted into the $s-1^{st}$ system of equations. In general, for the $i^{th}$ system of equations, from solution of the $i+1^{st}$ system of equations, $X_{i,j}$ of even indices are already known, and $X_{i,j}$ of odd indices are still unknown. We have three cases to consider.

1. Consider the first equation in the $i^{th}$ system of equations:

$$[A_i \quad B_i] \begin{bmatrix} X_{i,1} \\ X_{i,2} \leftarrow X_{i+1,1} \end{bmatrix} = Y_{i,1}, \quad (34)$$

where $X_{i,2}(X_{i+1,1})$ has been found from the solution of the $i+1^{st}$ system of equations. We have $$X_{i,1} = A_i^{-1}(Y_{i,1} - B_{i,1} X_{i+1,1}). \quad (35)$$

2. Consider the $2k+1^{st}$ equation in the $i^{th}$ system of equations, k=1, 2, etc.:

$$2k+1: \ [B_i^* \ A_i \ B_i] \begin{bmatrix} X_{i,2k} \leftarrow X_{i+1,k} \\ X_{i,2k+1} \\ X_{i,2k+2} \leftarrow X_{i+1,k+1} \end{bmatrix} = Y_{i,2k+1}, \quad (36)$$

where the values of $X_{i,2k}(X_{i+1,k})$ and $X_{i,2k+2}(X_{i+1,k+1})$ have been found from the solution $$A_i X_{i,2k+1} = Y_{i,2k+1} - B^*_i X_{i+1,k} - B_i X_{i+1,k+k}, \quad (37)$$

or $$X_{i,2k+1} = A_i^{-1}(Y_{i,2k+1} - B^*_i X_{i+1,k} - B_i X_{i+1,k+1}). \quad (38)$$

3. If $L_i$ is odd($L_i = 2k+1$), then $X_{i,L_i}$ is found from the last block equation:

$$[B_i^* \ D_i] \begin{bmatrix} X_{i,L_i-1} \\ X_{i,L_i} \end{bmatrix} = Y_{i,L_i} \quad (39)$$

with $$X_i, L_{i-Di}^{-1}(Y_{i,L_i} - B^*_i X_{i,L_i-1}). \quad (40)$$

Consequently for the $i^{th}$ system of equations, we just solve the block equations corresponding to odd indict. Hence all the unknowns in the $i^{th}$ system of equations are found. The above procedure can be recursively applied to the $i-1^{st}$, $i-2^{nd}$, ... systems of equations until the unknowns in the system of equations as given in(7) are all found.

Apparently, the main computation is on the right-side of the equations. The update of the triplets involves light computation.

In summary, the solution of the block tridiagonal system of equations as given in (10) is executed with two procedures. In the first procedure, the size of the system of equations is reduced, which is called forward reduction (306), a flow chart of which is shown in FIG. 4. The first procedure involves forward division steps which are recursively computed until a predefined stopping criterion is satisfied. The stopping criterion may be the condition that the length of the latest generated right-hand vector is dJ or that the superdiagonal block matrix in the latest of the series of matrices and vectors becomes a zero matrix. In the second procedure, solved unknowns are substituted into larger systems of equations and more unknowns are solved, which is called backward substitution (308), a flow chart of which is shown in FIG. 5.

Computational Procedure

The whole procedure is naturally separated into two parts: the forward reduction procedure and the backward substitution procedure.

The forward reduction procedure:

1. $A_1 := A$, $B_1 := B$, $D_1 := A$, $Y_1 := Y$, $L_1 := L$, $i := 1$.
2. Find the inverse of $A_i$: $A_i^{-1}$.
3. $Q_i := B_i A_i^{-1}$ and $E_i := B^*_i A_i^{-1}$.
4. $A_{i+1} := A_i - E_i B_i - (E_i B_i)^*$.
5. $B_{i+1} := -Q_i B_i$.
6. If $L_i$ is odd,
   (a) $P_i := B_i D_i^{-1}$,
   (b) $D_{i+1} := A_i - P_i B^*_i - E_i B_i$,
   (c) $L_{i+1} := \frac{L_i - 1}{2}$,
   (d) $Y_{i+1,k} := -E_i Y_{i,2k-1} + Y_{i,2k} - Q_i Y_{i,2k+1}, 1 \leq k < L_i + 1$,
   (e) $Y_{i+1,L_{i+1}} := -E_i Y_{i,L_i-2} + Y_{i,L_i-1} - P_i Y_{i,L_i}$
   If $L_i$ is even
   (a) $D_{i+1} := D_i - E_i B_i$,
   (b) $L_{i+1} := \frac{L_i}{2}$,
   (c) $Y_{i+1,k} := -E_i Y_{i,2k-1} + Y_{i,2k} - Q_i Y_{i,2k+1}, 1 \leq k < L_{i+1}$,
   (d) $Y_{i+1,L_{i+1}} := -E_i Y_{i,L_i-1} + Y_i, L_i$.
7. Store $A_{i+1}^{-1}$, $D_{i+1}^{-1}$, $Q_i$, $E_i$, $P_i$ (if it is calculated), and $Y_i$.
8. $i := i+1$.
9. Repeat 2 to 8 until $L_i = 1$
10. $s := i$.

A flow chart of the above-stated procedure is given in FIG. 4. The backward substitution procedure:

1. Solve $D_s X_s = Y_s$.
2. $i := s-1$.
3. $X_{i,2k} := X_{i+1,k}, 1 \leq k \leq L_{i+1}$.
4. $j := 1$.

5. $X_{i,j} := \begin{cases} A_i^{-1} Y_{i,1} - E_i^* X_{i,j+1}, & \text{if } j = 1. \\ -Q_i^* X_{i,j-1} + A_i^{-1} Y_{i,j} - E_i^* X_{i,j+1}, & \text{if } 1 < j < L_i. \\ -P_i^* X_{i,j-1} + D_i^{-1} Y_{i,j}, & \text{if } j = L_i. \end{cases}$ 6. $j := j+2$, if $j < L_i$ go to 5.
7. $i := i-1$, if $i > 0$ go to 3.
8. $X_1$ is then the estimate of X.

A flow chart of the above-stated procedure is given in FIG. 5.

Although the system and method of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

What is claimed is:

1. A method for estimating at least a subset of symbol sequences from received signals at multiple receivers in a multiple receiver communication system wherein each of said multiple receivers receives a sum of signals from a plurality of transmitters sharing the same communication medium, wherein said signals are formed by a sequence of contiguous symbols, each of which occupies a fixed time duration, and samples said received signals with a time interval that is the inverse of an integer multiple of said fixed time duration, wherein said integer multiple is no smaller than the number of said signals divided by the number of said receivers, wherein the channels of said signals have finite impulse response and are different from one another, said symbol estimation method comprises:

(a) sampling said received signals at multiple receivers with a time interval equal to a $$\frac{1}{F}$$

fraction of said fixed time duration, wherein F, an integer is no smaller than $$\frac{J}{M\,M_t},$$

wherein J is the number of said transmitters, M is the number of said receivers, $M_t$ is a positive integer, and generating Q sampled received signals from each of said received signals, wherein Q is an integer no larger than $M_t$;

(b) constructing data vectors from sampled received signals by filtering them with channel responses between said transmitters and said receivers and multiplexing outputs of said filtering;

(c) obtaining the maximum length of the channel responses of users at multiple receivers, which is denoted as d+1, and constructing a channel response matrix for each receivers;

(d) constructing space-time correlation matrices with said channel response matrices;

(e) constructing a second set of matrices and vectors computed from said space-time correlation matrices and said data vectors;

(f) applying a recursive bisection approach on said second set of matrices and vectors to generate an output sequence, wherein said recursive bisection approach comprises:

forward division steps which recursively compute a first series of matrices and vectors initially based on said second set of matrices and vectors and yield vectors in said first series of vectors and matrices with $dJ\lfloor L_i/2 \rfloor$ rows where $dJL_i$ is the number of rows of the last element in said first series of vectors and matrices, until a pre-defined stopping criterion is satisfied, where $\lfloor x \rfloor$ denotes the floor function evaluated on x, wherein $L_i$ is an integer variable which is updated in each of said forward division steps, backward substitution steps which first construct an intermediate solution with the last of the first series of matrices and vectors and recursively compute, in a reverse order of said forward division steps, a second series of vectors with said first set of matrices and vectors until exhausting all of said first set of matrices and vectors; and (g) demultiplexing the vector from the last in said second series of vectors; whereby said symbols of said signals are found from said output sequence.

2. The symbol estimation method in claim 1 wherein said channel responses are convolutions of physical channels and their corresponding pulse shaping filters.

3. The symbol estimation method in claim 1 wherein said channel responses are convolutions of physical channels and their corresponding spreading codes of said signals in a code-division-multiple-access communication system.

4. The symbol estimation method in claim 1 wherein said channel responses are convolutions of physical channels, their corresponding spreading codes of said signals, and their corresponding pulse shaping filters in a code-division-multiple-access communication system.

5. The symbol estimation method in claim 1 wherein said channel response matrix comprises channel filter responses.

6. The symbol estimation method in claim 1 wherein the vectors in said second set of matrices and vectors are constructed by adding up said data vectors.

7. The symbol estimation method in claim 1 wherein each of said channel response matrices is constructed for each said receiver by putting the channel filter responses between said transmitters and said receiver as columns in a matrix according to the user index, zeros are padded to said channel response matrices if necessary so that the number of rows in all said channel response matrices is the smallest integer multiple of the maximum channel response length.

8. The symbol estimation method in claim 1 wherein said space-time correlation matrices are constructed by adding up the correlation results of channel response matrices.

9. The symbol estimation method in claim 1 wherein the matrices in said second set of matrices and vectors comprises three matrices $A_1$, $B_1$, and $D_1$ which are constructed by first finding the maximum length of channel filter responses of all users, padding zeros to channel filter responses whereby all of them are of d+1 symbol durations wherein d is the least integer possible, constructing d time correlation matrices for each receiver with d matrices obtained from dividing the channel filter responses at that receiver into d+1 parts, constructing d spatial-time correlation matrices for multiple receivers by adding up the time correlation matrices for all receivers with the same time shift, constructing $A_1$ according to a block-Toeplitz structure with spatial-time correlation matrices $0, \ldots, d-1$, constructing $B_1$ according to another block-Toeplitz structure with spatial-time correlation matrices $-1, \ldots, -d$, an d finally assigning $A^1$ to $D_1$.

10. The symbol estimation method in claim 1 wherein said first series of matrices and vectors comprises a series of three dJ×dJ channel description matrices which are $A_i$ the ordinary diagonal block matrix, $B_i$ the superdiagonal block matrix, $D_i$ the special diagonal block matrix, and a right-hand vector which is divided into dJ×1 blocks which are indexed from one, wherein i is an integer.

11. The symbol estimation method in claim 1 wherein said forward division steps comprise putting said second set of matrices and vectors as the first of said first series of matrices and vectors and computing recursively new channel description matrices from the latest channel description matrices and a new right-hand vector with blocks from linear combinations of blocks of even index and their neighboring blocks in the last right-hand vector.

12. The symbol estimation method in claim 1 wherein said predefined stopping criterion is that the length of the latest generated right-hand vector is dJ or that the superdiagonal block matrix in the latest of said first series of matrices and vectors becomes a zero matrix.

13. The symbol estimation method in claim 1 wherein said backward substitution step further comprises solving the equations as defined by the latest of said first series of matrices and vectors, putting latest channel description matrices and the solution as the first of said second series of matrices and vectors, assigning the blocks of the vector of the latest in said second series of matrices and vectors to the even blocks of a new vector and computing the odd blocks of the new vector from these blocks and corresponding right-hand vectors.

14. The symbol estimation method in claim 1 wherein said spatial-time correlation matrices denoted by $T_k$, $k=0, \ldots -d$, are constructed by $$\sum_{m=1}^{M}\sum_{n=1}^{d+k}(H_{d+1-n}^{(m)})^{*}H_{(d+1-n+k)}^{(m)}+\delta(k)\nu I$$

wherein a channel response matrix $C_m$ at receiver m, $m=1, \ldots, M$, consisting of (d+1)J rows, where d+1 is said maximum channel response length, and J columns, which are the channel responses from transmitters to the receiver m, Is related to $H_n^{(m)}$, n=1, ..., d+1 by $$C_m = \begin{bmatrix} H_1^{(m)} \\ H_2^{(m)} \\ \vdots \\ H_{d+1}^{(m)} \end{bmatrix}$$

where $\delta(\cdot)$ is the Kronecker function, v is a variance of noise for minimum-mean-square-error joint detection and 0 for zero-forcing joint detection, wherein I is an identity matrix.

15. The symbol estimation method in claim 14 wherein said second set of matrices and vectors consists of channel description matrices $A_1$, $B_1$, $D_1$, and a vector $Y_1$;
   wherein $A_1$ is composed of d×d blocks, wherein the (p,j) block of $A_1$ is $T_{j+p}$ if j≧p, and $T^*_{-j+p}$ if j<p, where p and j are integers;
   wherein $B_1$ is composed of d×d blocks, wherein the (p,j) block of $B_1$ is $T_{-d+j-p}$ if p≧j, and $0_{J\times J}$ if p<j;
   wherein $D_1$ is $A_1^*$;
   wherein $Y_1$ is $$\sum_{m=1}^M R_m,$$

wherein $R_m$ is said signal obtained from receiver m.

16. The symbol estimation method in claim 15, wherein i is an integer greater than or equal to one, wherein an $i^{th}$ step of said forward division steps comprises:
$A_{i+1} := -B_i^* A_i^{-1} B_i + A_i - B_i A_i^{-1} B_i^*$
$B_{i+1} := -B_i A_i^{-1} B_i$
$B_{i+1}^* := -B_i^* A_i^{-1} B_i^*$
$Y_{i+1,k} := -B_i^* A_i^{-1} Y_{i,2k-1} + Y_{i,2k} - B_i A_i^{-1} Y_{i,2k+1}, K=1, \ldots,$ $$\left\lfloor \frac{L_i - 3}{2} \right\rfloor;$$

wherein said $i^{th}$ forward division step further comprises:
$D_{i+1} := A_i - B_i D_i^{-1} B_i^* - B_i^* A_i^{-1} B_i$
$L_{i+1} := \frac{1}{2}(L_i - 1)$
$Y_{i+1,L_i} := -B_i^* A_i^{-1} Y_{i,L_i-2} + Y_{i,L_i-1} - B_i^* D_i^{-1} Y_{i,L_i}$
if $L_i$ is odd; or
$D_{i+1} := D_i - B_i^* A_i^{-1} B_i$
$L_{i+1} := \frac{1}{2}(L_i - 1)$
$Y_{i+1,L_{i+1}} := -B_i^* A_i^{-1} Y_{i,L_i-1} + Y_{i,L_i}$
if $L_i$ is even.

17. The symbol estimation method in claim 1 wherein said pre-defined stopping criterion is $L_{i+1}=1$ or $B_{i+1}=0$, wherein an integer variable s is set to i+1 and the forward division steps stop when the pre-defined stopping criterion is satisfied.

18. The symbol estimation method in claim 17 wherein said intermediate solution comprises solving the equation $D_s X_s = Y_s$ for a vector $X_s$.

19. The symbol estimation method in claim 18 wherein said backward substitution step i, i=s, ..., 1, comprises:
$X_{i,1} = A_i^{-1} Y_{i,1} - A_i^{-1} B_i X_{i+1,1}$,
$X_{i,2k+1} = A_i^{-1} Y_{i,2k+1} - A_i^{-1} B_i^* X_{i+1,k} - A_i^{-1} B_i X_{i+1,k+1}, 1 \leq 2k+1 < L_i,$
$X_{i,L_i} = D_i^{-1} Y_{i,L_i} - D_i^{-1} B_i^* X_{i+1,L_{i+1}}$ if $L_i$ is odd.

20. A method for estimating at least a subset of symbol sequences from a received signal at a receiver in a communication system, the method comprising:
   (a) oversampling said received signal, thereby producing a plurality of received signal sample sets;
   (b) constructing data vectors from the received signal sample sets;
   (c) obtaining the maximum length of the channel responses of users at multiple virtual receivers, which is denoted as d+1, and constructing a channel response matrix for each receiver,
   (d) constructing space-time correlation matrices with said channel response matrices;
   (e) constructing a second set of matrices and vectors computed from said space-time correlation matrices and said data vectors;
   (f) generating an output sequence by applying a recursive bisection approach on said second set of matrices and vectors, wherein said recursive bisection approach comprises:
      forward division steps which recursively compute a first series of matrices and vectors initially based on said second set of matrices and vectors and yield vectors in said first series of vectors and matrices with $dJ\lfloor L_i/2 \rfloor$ rows where $dJL_i$ is the number of rows of the last element in said first series of vectors and matrices, until a pre-defined stopping criterion is satisfied, where $\lfloor x \rfloor$ is the floor function evaluated on x, wherein $L_i$ is an integer variable which is updated in each of said forward division steps,
      backward substitution steps which first construct an intermediate solution with the last of the first series of matrices and vectors and recursively compute, in a reverse order of said forward division steps, a second series of vectors with said first set of matrices and vectors until exhausting all of said first set of matrices and vectors; and
   (g) detecting symbols in the received signal by demultiplexing the vector from the last in said second series of vectors; whereby said symbols in the received signal are found from said output sequence.

21. The method of claim 20, wherein each of said multiple receivers receives a sum of signals from a plurality of transmitters sharing the same communication medium, wherein said signals are formed by a sequence of contiguous symbols, each of which occupies a fixed time duration, and samples said received signals with a time interval that is the inverse of an integer multiple of said signals divided by the number of said receivers, wherein the channels of said signals have finite impulse response and are different from one another.

22. The method of claim 20, wherein said oversampling said received signal is performed at multiple receivers within a time interval equal to a 1/P fraction of said fixed time duration, wherein P is an integer no smaller than $J/(MM_t)$, wherein J is the number of said transmitters, M is the number of said receivers, $M_t$ is a positive integer and generating Q sampled received signals from each of said received signals wherein Q is an integer no larger than $M_t$.

23. The method of claim 20, wherein said constructing includes constructing the data vectors from the sampled received signals by filtering them with channel responses between said transmitters and said receivers and multiplexing outputs of said filtering.

* * * * *

UNITED STATES PATENT AND TRADEMARK OFFICE
CERTIFICATE OF CORRECTION

PATENT NO. : 6,856,643 B1
DATED : February 15, 2005
INVENTOR(S) : Yang et al.

It is certified that error appears in the above-identified patent and that said Letters Patent is hereby corrected as shown below:

Column 14,
Line 28, please delete "an d" and substitute -- and --.
Line 29, please delete "$A^1$" and substitute -- $A_1$ --.
Line 59, please delete "denoted by" and substitute -- denoted as --.
Line 60, please delete "k=0,...–d, are constructed by" and substitute
-- k=0,...,–d, are constructed by --.

Column 15,
Line 3, please delete "Is" and substitute -- is --.
Line 18, please delete "$A_1$ is $T_{j+p}$" and substitute -- $A_1$ is $T_{-j+p}$ --.

Line 47 please delete "$Y_{i+1,L_i} := -B_i^* A_i^{-1} Y_{i,L_i-2} + Y_{i,L_i-1} - B_i^* D_i^{-1} Y_{i,L_i}$"
and substitute -- $Y_{i+1,L_{i+1}} := -B_i^* A_i^{-1} Y_{i,L_i-2} + Y_{i,L_i-1} - B_i^* D_i^{-1} Y_{i,L_i}$ --

Line 50, please delete "$L_{i+1} := \frac{1}{2}(L_i - 1)$"
and substitute -- $L_{i+1} := \frac{1}{2} L_i$ --.

Signed and Sealed this

Twenty-sixth Day of July, 2005

JON W. DUDAS
*Director of the United States Patent and Trademark Office*